July 11, 1967　　　J. B. PUTTERBAUGH ETAL　　　3,330,172
TIMER INDEXING MECHANISM
Filed Aug. 20, 1965　　　　　　　　　　　　　　　　4 Sheets-Sheet 1
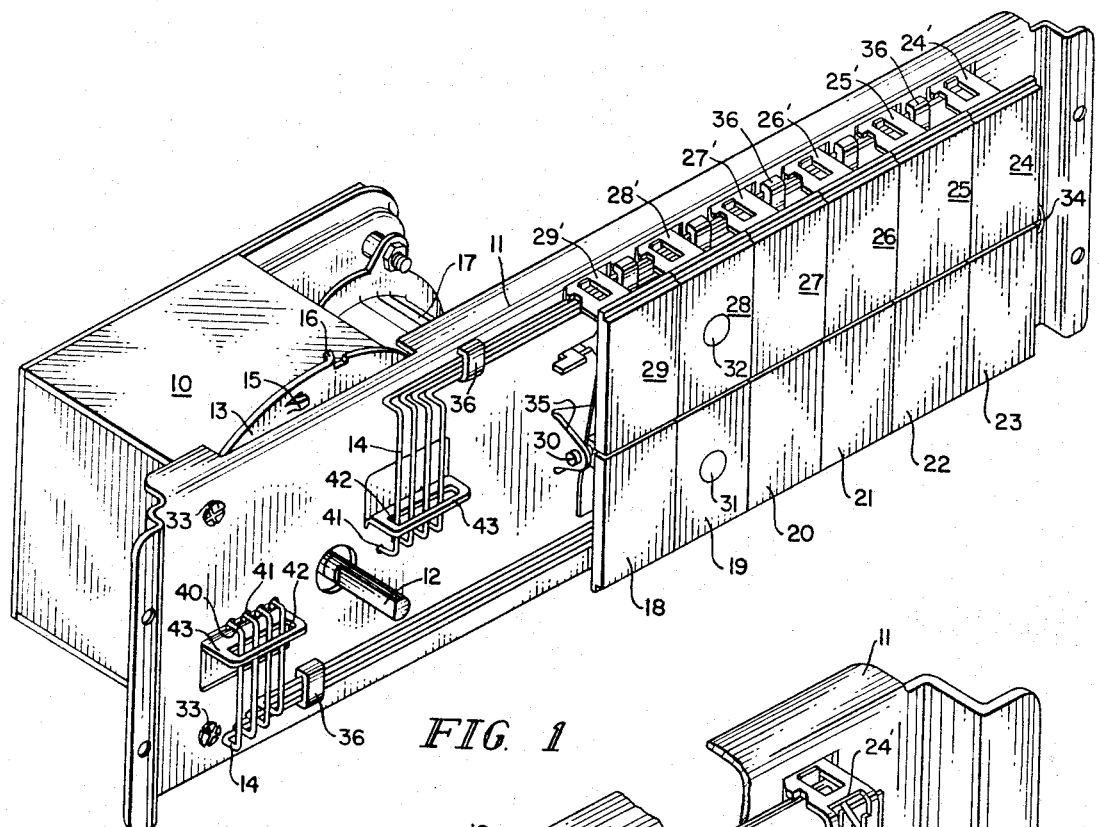
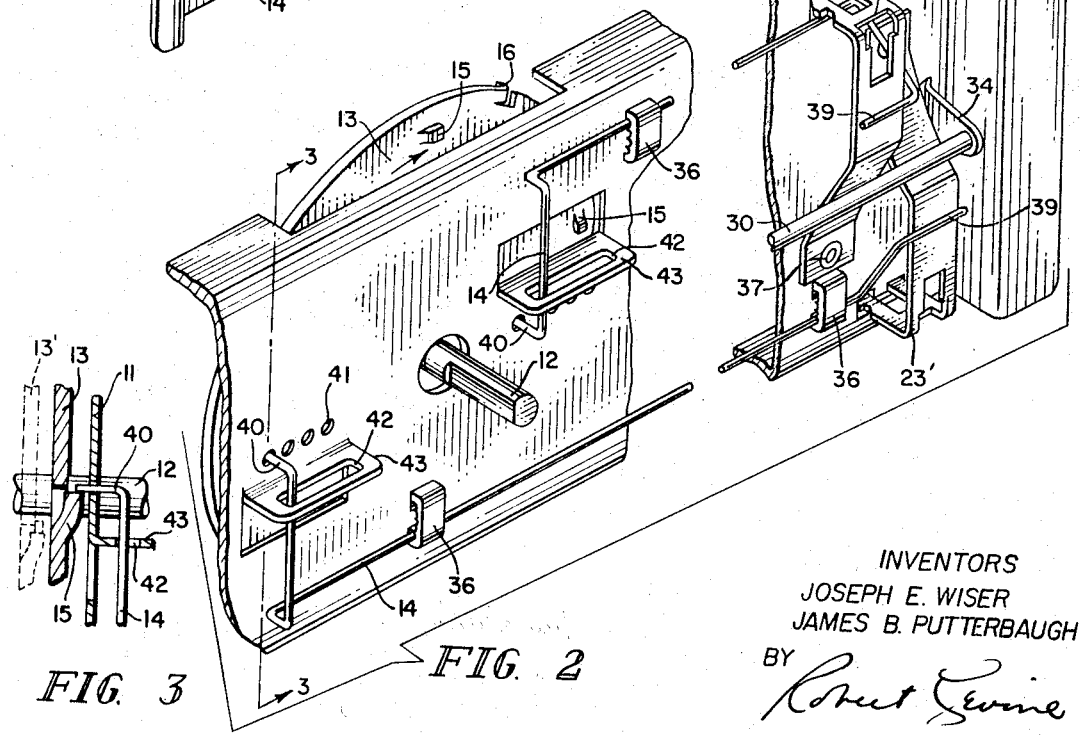
INVENTORS
JOSEPH E. WISER
JAMES B. PUTTERBAUGH
BY
ATTORNEY

INVENTORS
JOSEPH E. WISER
JAMES B. PUTTERBAUGH

ATTORNEY

July 11, 1967 — J. B. PUTTERBAUGH ETAL — 3,330,172
TIMER INDEXING MECHANISM
Filed Aug. 20, 1965 — 4 Sheets-Sheet 3

INVENTORS
JOSEPH E. WISER
JAMES B. PUTTERBAUGH
BY Robert Levine
ATTORNEY

July 11, 1967  J. B. PUTTERBAUGH ETAL  3,330,172
TIMER INDEXING MECHANISM
Filed Aug. 20, 1965  4 Sheets-Sheet 4
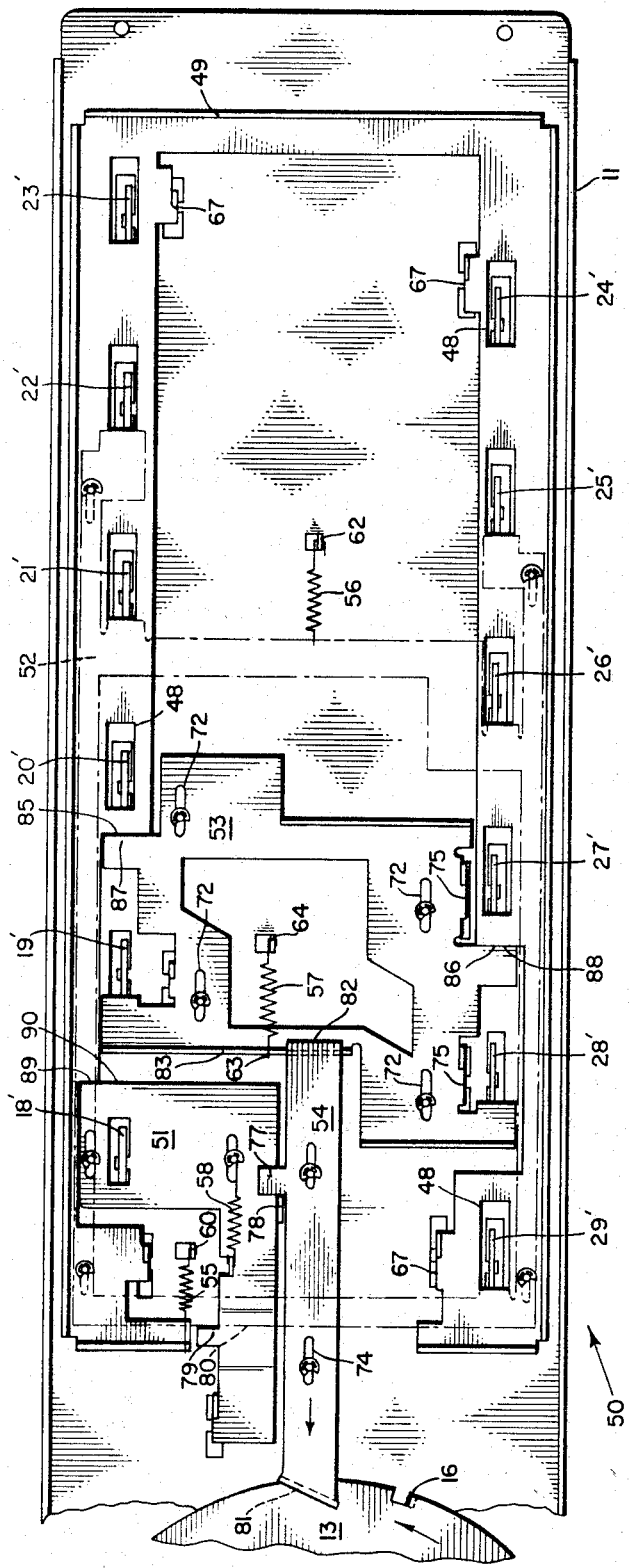
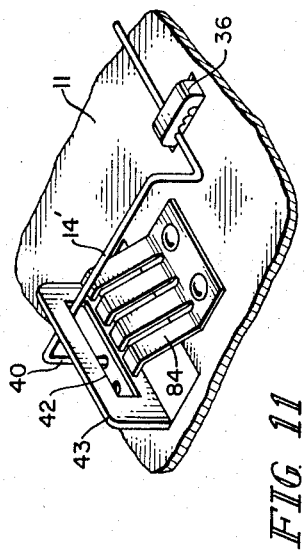
FIG 11
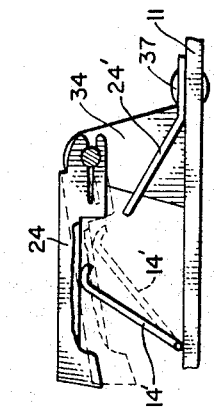
FIG 10
FIG. 9
INVENTORS
JOSEPH E. WISER
JAMES B. PUTTERBAUGH
BY
ATTORNEY

United States Patent Office 3,330,172
Patented July 11, 1967

3,330,172
TIMER INDEXING MECHANISM
James B. Putterbaugh and Joseph E. Wiser, Indianapolis, Ind., assignors to P. R. Mallory & Co. Inc., Indianapolis, Ind., a corporation of Delaware
Filed Aug. 20, 1965, Ser. No. 481,241
17 Claims. (Cl. 74—813)

ABSTRACT OF THE DISCLOSURE

In combination, a timer and an indexing device for ascertaining a cycle starting point of the timer. The indexing device includes a plurality of latch-springs, a plurality of rocker-buttons coupled to the latch-springs for displacing the latch-springs as the rocker-buttons are displaced and a plurality of integrally formed metal strips having bent end portions and a main body portion. One of the end portions of the strips is coupled to each of the latch-springs so as to rotate the main body when the latch-springs are depressed. The main body portion is rotatably affixed to a base and extends therealong. The other end portions are bent so as to have a tip protruding through the opening in the base when the main body is rotated. The tip functions as a selective stop for an indexing member mounted on the timer. A shaft is used for rotating the indexing member so as to engage the stop thereby locating the cycle starting point.

---

The present invention relates generally to a timer and more particularly to the means and method for providing a selective indexing mechanism for locating the cycle starting point of a timer.

In many contemporary machines featuring automatic operation, and particularly in domestic appliances, there is an ever-increasing demand for versatility of cycle programming. For instance, modern automatic washing machines offer a multiplicity of cycle programs capable of accommodating variations in fabrics, variations in soil condition of apparel, variations in quantity of wash load, etc.

Since a timer ordinarily has only one revolution or 360 degrees throughout which it may operate without cycle repetition, it therefore becomes necessary to incorporate all the required programs within that angular travel. The angular spacing between adjacent programs will obviously diminish in relation to the number of programs to be accommodated in a given machine application. Hence, the need arises for accurately determining the respective starting points so that the desired cycle or cycles may be established without error. It is possible to do this with a mechanical indexing device which will accurately locate an indexing member on a timer at a selected angular position.

Accordingly, the present invention discloses a rocker-button indexing mechanism for locating the cycle starting point of a timer. The rocker-button feature is to provide the operator of the machine containing the mechanism with a convenient method for actuating the indexing mechanism. It is for this reason that the invention will be referred to as a rocker-button indexing mechanism as well as an indexing mechanism, an indexing device, or a selective indexing mechanism.

A particularly attractive and novel feature of the present invention is that the rocker-buttons rotate stop-levers which can span a considerable distance from the indexing member on the timer to the rocker-buttons. This feature will permit flexible placement of the rocker-buttons. The fact that the stop-levers rotate instead of deflecting is a novel feature. Since movement is accomplished by rotation, the pressure required to actuate the stop-lever is not dependent on the length of the lever as it is when the actuation members are deflected.

It is an object of the present invention, therefore, to provide a rocker-button indexing mechanism of unique construction for accurately selecting starting points within the cycle of a timer.

Still another object of the present invention is to provide an indexing device for establishing the starting point of a timer wherein the actuating mechanism is simple, efficient, reliable, and economical.

Still another object of the present invention is to provide an indexing device for establishing the starting point of a timer wherein the actuating mechanism contains rotatable levers which are actuated by pivotally mounted rocker-buttons.

Still another object of the present invention is to provide an indexing device with rocker-buttons for actuating said device and with a latching means for holding certain combinations of activated rocker-buttons.

Still another object of the present invention is to provide a means for locating a cycle starting point on a timer which has a plurality of rocker-buttons for actuating said means and a means for automatically releasing selected rocker-buttons when said timer cycle is completed.

The present invention, in another of its aspects, relates to novel features of the instrumentalities described herein for teaching the principal object of the invention and to the novel principles employed in the instrumentalities whether or not these features and principles may be used in the said object and/or in the said field.

Other objects of the invention and the nature thereof will become apparent from the following description considered in conjunction with the accompanying drawings and wherein like reference numbers describe elements of similar function therein and wherein the scope of the invention is determined rather from the dependent claims.

For illustrative purposes, the invention will be described in conjunction with the accompanying drawings in which:

FIGURE 1 is a perspective view of a timer employing the rocker-button indexing mechanism of the present invention.

FIGURE 2 is a fragmentary perspective view of the rocker-button indexing mechanism illustrating how depression of a latch-spring causes a stop-lever to interfere with stop-lugs on the timer stop-disc.

FIGURE 3 is a sectional view 3—3 of FIGURE 2, showing how a stop-lever restrains a stop-lug on the timer stop-disc.

FIGURE 9 is a fragmentary back view of the rocker-button indexing mechanism illustrating the function of the latch-bars.

FIGURE 10 is a fragmentary side view of the rocker-button indexing mechanism showing an optional method where the stop-levers are spring loaded against the rocker-buttons.

FIGURE 11 is a fragmentary perspective view of the rocker-button indexing mechanism showing an optional method of spring loading the stop-levers.

Figure 4:
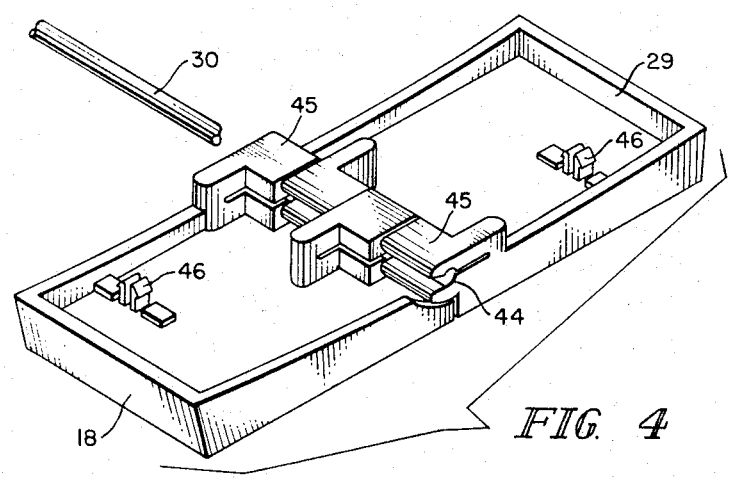
FIGURE 4 is an exploded perspective view of the two rocker-buttons illustrating how the rocker-buttons are assembled to a common hinge-pin.

Generally speaking, the present invention involves an indexing device for determining a cycle starting point of a timer comprising, a base mounted on said timer, a plurality of latch-springs mounted to said base, a plurality of integrally formed metal strips, each of said strips having bent end portions and a main body portion, one of said end portions coupled to each of said latch-springs so as to rotate said main body when said latch-springs are depressed, said main body portions rotatably affixed to said base and extending therealong, said other end portion bent so as to have its tip protrude through an opening in said base when said main body is rotated, said tip providing a stop for an indexing member mounted on said timer, a shaft for rotating said indexing member so as to engage said stop, thereby locating said cycle starting point, and said shaft being axially movable so as to disengage said indexing member from said stop.

Referring now to the drawing, and particularly to the perspective view of FIGURE 1, the component parts of the rocker-button indexing mechanism of this invention can be visualized in conjunction with the following description. There is a timer 10 assembled to a base, hereinafter referred to as a mounting plate 11, by members 33, said mounting plate constituting a main structural member of the rocker-button indexing mechanism of the present invention. The timer 10 includes a rotating shaft 12 which protrudes through mounting plate 11, said rotating shaft being the means for supporting and rotating a plurality of control cams, or switch activating members, which operate a plurality of control switches to sequence the electrical output of the timer 10, and said rotating shaft being the means for supporting and rotating the timer 10 indexing member, hereinafter referred to as the stop-disc 13. The rotating shaft 12 is axially movable so as to move the stop-disc 13 in a position to interfere with one of the metal strips or levers, hereinafter referred to as the stop-levers 14, said stop-disc 13 having a plurality of stop-lugs 15 protruding therefrom, and said stop-disc 13 containing one latch-lug 16 for engaging and releasing parts of the latching assembly, not shown in FIGURE 1, of the rocker-button indexing mechanism when the timer 10 cycle is completed. The axially movable rotating shaft 12 is the means for rotating the stop-disc 13 so as to be restrained by a stop-lever 14 and the means for disengaging said stop-discs from said stop-lever. Motor 17 drives the timer 10 through the programmed timing cycle. Rocker-buttons 18, 19, 20, 21, 22, 23, 24, 25, 26, 27, 28, and 29 are assembled to mounting plate 11 by being snapped on to hinge-pin 30 and the latch-springs 18', 19', 20', 21', 22', 23', 24', 25', 26', 27', 28', and 29'. Rocker button 18 is affixed to latch-spring 18', rocker-button 19 is affixed to latch-spring 19', etc. Rocker-button 19 contains indicating light 31 and rocker-button 28 contains indicating light 32. The rocker-buttons 18 through 29 and latch-springs 18' through 29' are an example of a means for rotating the main body of the stop-levers 14. Hinge-pin 30 is supported and retained by tabs 34 and 35 protruding from the mounting plate 11. Clips 36 are a means for rotatably affixing stop-levers 14 to mounting plate 11.

Referring now to FIGURE 2, we see a fragmentary perspective view of the rocker-button indexing mechanism illustrating how actuation of one of the latch-springs 18' through 29' causes rotation of one of the stop-levers 14 so as to interfere with one of the stop-lugs 15 on stop-disc 13. Rivets 37 hold one end of the latch-springs 18' through 29' to the mounting plate 11. The first ends 39 of the stop-levers 14 are sandwiched between rocker-buttons 18 through 29 and latch-springs 18' through 29'. When the latch-springs 18' through 29' are depressed by rocker-buttons 18 through 29, the stop-levers 14 rotate and a second end 40 of the stop-levers protrudes through opening 41 in mounting plate 11 to interfere with the stop-lugs 15 on the stop-disc 13. The amount of travel of the second end 40 of the stop-levers 14 is controlled by the opening 42 in tab 43 which protrudes from the mounting plate 11.

Referring now to FIGURE 3, we see a sectional view showing a second end 40 of a stop-lever 14 interfering with a stop-lug 15 on stop-disc 13. Stop-disc 13', shown in dotted lines, is provided to illustrate how axial movement of rotating shaft 12 places stop-lugs 15 in a position not to interfere with the second end 40 of the stop-lever 14.

Referring now to FIGURE 4, we see an exploded perspective of two of the rocker-buttons 18 through 29 illsutrating how said rocker-buttons are assembled to a common hinge-pin 30. Groove 44 is designed to fit the hinge-pin 30 so that the rocker-buttons 18 through 29 can pivot on said hinge-pin. Appendages 45 forming the grooves 44 are resilient so as to snap over the hinge-pin 30 and appendages 46 are resilient so as to snap into appropriate apertures on the latch-springs 18' through 29', thereby providing for easy insertion or removal of the rocker-buttons 18 through 29.

Figure 5:
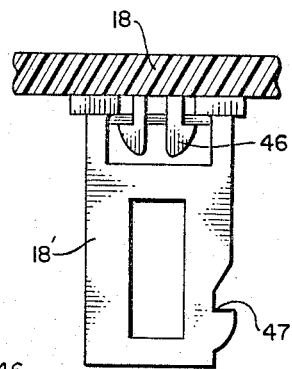
FIGURE 5 is a sectional view 5—5 of FIGURE 6, showing how the rocker-buttons are assembled to the latch springs.

Referring now to FIGURE 5, we see a sectional view showing how appendages 46 affix rocker-buttons 18 through 29 to the latch-springs 18' through 29', said latch-springs containing a notch 47 for engaging an aperture on a latch bar, not shown in FIGURE 5.

Figure 6:
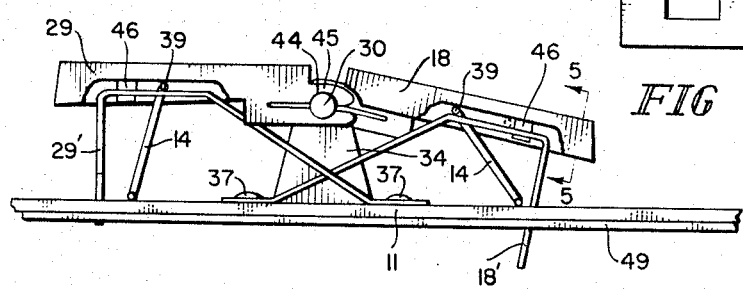
FIGURE 6 is a fragmentary side view of the rocker-button indexing mechanism showing how the rocker-buttons, latch-springs, and stop-levers are assembled.

Referring now to FIGURE 6, we see a fragmentary side view of the rocker-button indexing mechanism illustrating how the rocker-buttons 18 through 29, latch-springs 18' through 29', and stop-levers 14 are assembled together. Rocker-button 18 is shown depressed to illustrate how the second end 40 of said stop-lever, not shown in FIGURE 6, is caused to extend through holes 41 in mounting plate 11 to interfere with stop-lugs 15 on stop-disc 13.

Figure 7:
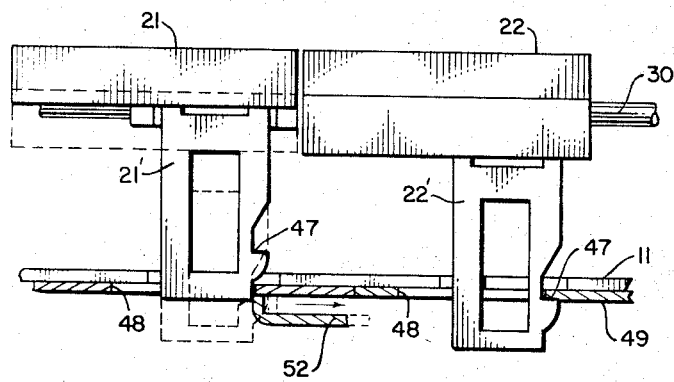
FIGURE 7 is a fragmentary view of the rocker-button indexing mechanism wherein the effect of depressing the rocker-buttons is illustrated.

Referring now to FIGURE 7, we see how the latch-springs 21' and 22' protrude through apertures 48 in the first latch-bar 49, said first latch-bar holding said latch-springs in position by fitting into notch 47 in said latch-springs. Also shown in FIGURE 7 is a portion of the third latch-bar 52 which is held in an activated position, represented by the dotted lines, by the curved portion of the latch-springs 18' through 20' just below notch 47. The latch-springs 18' through 29' and the various latch-bars are a means for holding the main body of the stop-levers 14 in a rotated position, said rotated position being determined by depression of an associated rocker-button 18 through 29.

Figure 8:
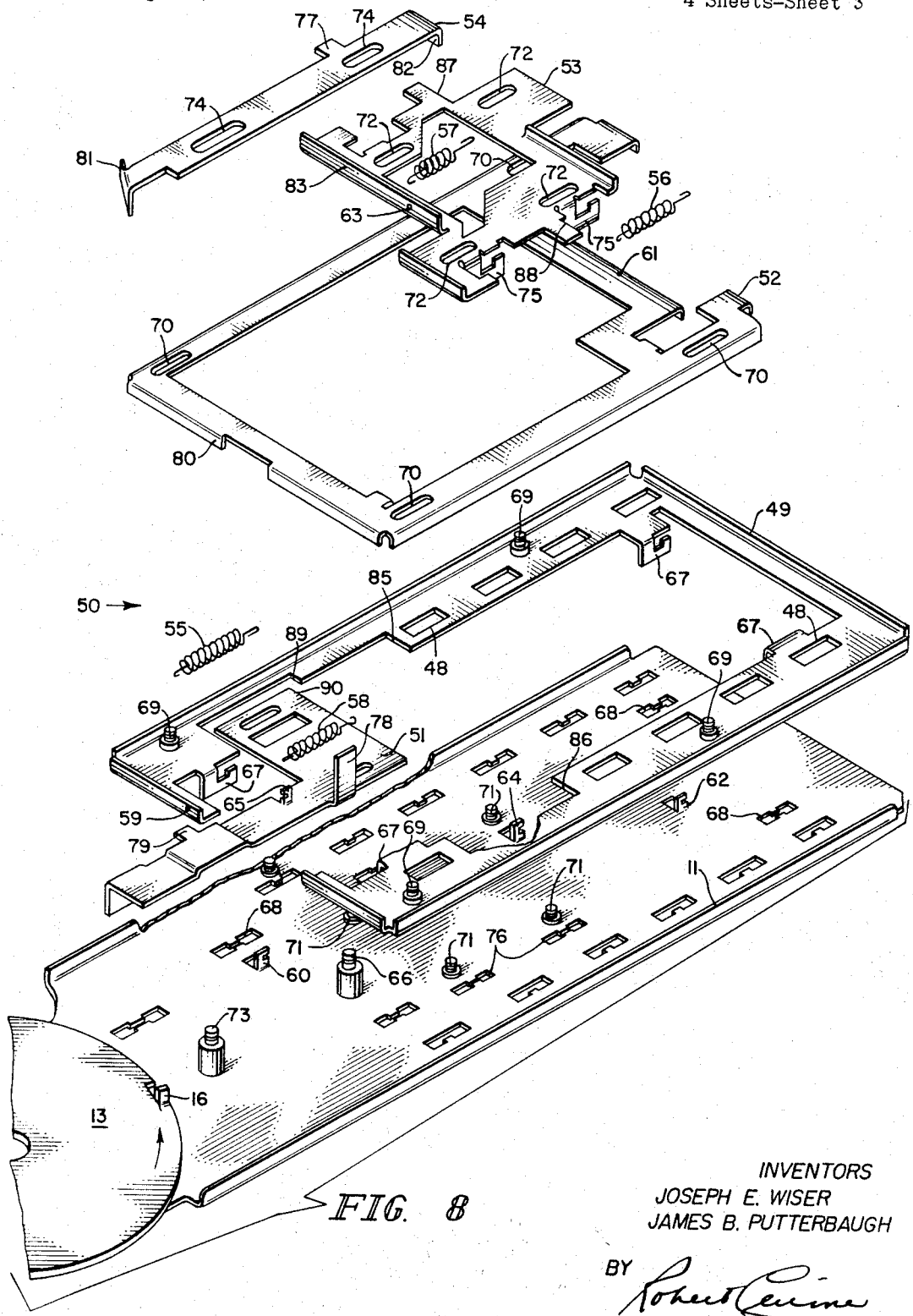
FIGURE 8 is an exploded perspective view of the latching assembly of the rocker-button indexing mechanism.

Referring now to FIGURE 8, we see an exploded perspective view of the latching assembly 50 comprising a first latch-bar 49, a second latch-bar 51, a third latch-bar 52, a fourth latch-bar 53, and a fifth latch-bar 54. Coil spring 55 is connected between a hole 59 on the first latch-bar 49 and a tang 60 protruding from mounting plate 11 so as to return said first latch-bar to an original position. Coil spring 56 is connected between a hole 61 in the third latch-bar 52 and a tang 62 protruding from the mounting plate 11 so as to return said third latch-bar to an original position. Coil spring 57 is connected between a hole 63 in the fourth latch-bar 53 and a tang 64 in the mounting plate 11 so as to return said fourth latch-bar to an original position. Coil spring 58 is connected between a tang 65 on the second latch-bar 51 and a post 66 on the mounting plate 11 so as to return said second latch-bar to an original position. The first latch-bar 49 has four notched tangs 67 which protrude through slots 68 in mounting plate 11 so as to slidably mount said first latch-bar to said mounting plate. Posts 69 on the first latch-bar 49 extend through slots 70 on the third latch-bar 52 so as to slidably mount said third latch-bar on said first latch-bar. Posts 71 on the mounting plate 11 extend through slots 72 in the fourth latch-bar 53 so as to slidably mount said fourth latch-bar on said mounting plate. Posts 66 and 73 on the mounting plate 11 extend through slots 74 in the fifth latch-bar so as to slidably mount said fifth latch-bar on said mounting plate. Notched tangs 75 on the fourth latch-bar 53 extend through slots 76 in mounting plate 11 to align said fourth latch-bar with respect to said mounting plate. Tang 77 on the fifth latch-bar 54 engages tang 78 on the second latch-bar 51. Front edge 80 of the third latch-bar 52 engages tang 79 of the second latch-bar 51. Latch-lug 16 on stop-disc 13 engages a front tang 81 on the fifth latch-bar 54. A back tang 82 on the fifth latch-bar 54 engages a front tang 83 on the fourth latch-bar 53. Front edges 85 and 86 of the first latch-bar 49 engage, respectively, back edges 87 and 88 of the fourth latch-bar 53. Front edge 89 of the first latch-bar 49 engages back edge 90 of the second latch-bar 51.

The latching assembly, as hereinbefore described, is a means for latching a specific combination of rocker-buttons 18 through 29. As used in this specification, the term latching encompasses both holding and releasing of the rocker-buttons 18 through 29 that are discussed in the specification. Obviously, other latching combinations could be devised without departing from the scope of this disclosure. For this reason, the latching assembly 50 will be referred to as a means for latching, holding or releasing the rocker-buttons 18 through 29. Also, the latching assembly 50 will be referred to as a means for holding the main body of the stop-levers 14 in a rotated position.

Referring now to FIGURE 9, we see a fragmentary back view of the rocker-button indexing mechanism illustrating the functional arrangement of the various components of the latching assembly 50. The operation of this assembly will be discussed in later paragraphs of this specification.

Referring now to FIGURE 10, we see an optional method for spring loading a stop-lever 14'. The stop-lever 14, shown in FIGURE 6, has a first end 39 restrained by the latch-springs 18' through 29' to store rotational energy in said stop-levers. The optional stop-lever 14' is spring loaded against the bottom of the rocker-buttons 18 through 29 so as to slide against the bottoms of said rocker-buttons. The spring load is provided by springs 84 shown in FIGURE 11 rather than by the latch springs as shown in FIGURE 6. A portion of a latch-spring 18' through 29' is shown in FIGURE 10.

Referring now to FIGURE 11, we see a plurality of leaf springs 84 riveted to the mounting plate 11 so as to press against the stop-levers 14'. This is an optional method of spring loading the stop-levers 14' against the bottom of the rocker-buttons 18 through 29 as shown in FIGURE 10.

With the above description of mechanical parts in mind, and by making reference to the drawing figures, the following analysis of operation will serve to convey the functional details of the rocker-button indexing mechanism. Referring now to FIGURE 1, we can assume that an operator of the equipment containing the present invention has selected a cycle starting point represented by rocker-button 24. By depressing rocker-button 24, the latch-spring 24', which is affixed to said rocker-button, will protrude into an appropriate aperture in the latching assembly 50, not shown in FIGURE 1, and will allow the stop-lever 14, the first end 39 of which is held by said latch-spring, to rotate so as to extend the second end 40 of said stop-levers through an opening 41 in the mounting plate 11 to interfere with an appropriate stop-lug 15 on stop-disc 13. At that point, the operator will axially pull rotating shaft 12 to a second position and will manually rotate said rotating shaft until a stop-lug 15 hits the end 40 of stop-lever 14 which is extending through hole 41 in mounting plate 11, thereby locating the selected cycle starting point. The amount that the stop-lever 14 will extend through the opening 41 in mounting plate 11 is determined by the depth of the opening 42 in the tab 43.

In many types of laundry equipment, several combinations of rocker-buttons 18 through 29 must be depressed in order to obtain the correct cycle starting point and to set up the correct water temperature, etc. In order to facilitate this requirement, the rocker-button indexing mechanism has been provided with a latching assembly 50 to hold certain rocker-buttons into position and to release said rocker-buttons at the correct time. The latching assembly 50 shown in FIGURE 8, includes a first latch-bar 49, a second latch-bar 51, a third latch-bar 52, a fourth latch-bar 53, and a fifth latch-bar 54, all of which are spring loaded to return to their original position after being moved either by a latch-spring 18' through 29', the latching lug 16, or another latch-bar. The method which is used to move the first latch-bar 49 by a latch spring 18' through 29' can be visualized by referring to FIGURE 7. As rocker-button 22 is depressed, the latch-spring 22' which is affixed to said rocker-button will protude through aperture 48 in the first latch-bar 49. As the latch-spring 22' protrudes through the aperture 48, the curved portion of said latch-spring just below notch 47 causes the first latch-bar 49 and the third latch-bar 52 to move in the direction indicated by the arrow, shown in FIGURE 7, until said first latch-bar can move back into said notch, said third latch-bar being held into position by said curved portion of said latch-spring. The relative movement of the latch-spring 18' through 29' and rocker-buttons 18 through 29 is illustrated by the dotted outlines of the rocker-button 21, the latch-spring 21' attached thereto, and the third latch-bar 52. The latch-lug 16 on stop-disc 13 will also move components of the latching assembly 50 as illustrated in FIGURE 9. The stop-disc 13 rotates in the direction of the arrow shown on said stop-disc to engage a front tang 81 on the fifth latch-bar 54 so as to move said fifth latch-bar in the direction of the arrow shown on said fifth latch-bar. The combination of the latch-lug 16 and the fifth latch-bar 54 provides a means for automatically releasing selected rocker-buttons 18 through 29 when the timer 10 completes its cycle.

Referring further to FIGURE 9, the functional relationship of the first latch-bar 49, second latch-bar 51, third latch-bar 52, fourth latch-bar 53, and the fifth latch-bar 54 can be visualized. The first latch-bar 49 is caused to move by the protrusion of latch-springs 20', 21', 22', 23', 24', 25', 26', 27', and 29' through appropriate apertures in said first latch-bar. The second latch-bar 51 is caused to move by the protrusion of latch-spring 18' through the associated aperture in said second latch-bar. The third latch-bar 52 is caused to move, and to stay in an activated position, by the protrusion of latch-springs 21', 22', 25', 26', and 29' through appropriate apertures in the mounting plate 11 and the first latch-bar 49. The fourth latch-bar 53 is caused to move by the protrusion of latch-springs 19' and 28' through appropriate apertures in mounting plate 11. The fifth latch-bar 54 is caused to move by the action of the latch-lug 16 of the stop-disc 13 against the front tang 81 of said fifth latch-bar.

When the first latch-bar 49 is moved by latch-springs 20', 21', 22', 23', 24', 25', 26', 27', or 29', front edges 85 and 86 of said first latch-bar engage, respectively, back edges 87 and 88 of the fourth latch-bar 53 so as to move said fourth latch-bar and front edge 89 of said first latch-bar engages back edge 90 of the second latch-bar 51 so as to move said second latch bar.

When the third latch-bar 52 is moved by latch-spring 21', 22', 25', 26', or 29', the front edge 80 of said third latch-bar engages tang 79 on the second latch-bar 51 so as to move said second latch-bar.

When the fifth latch-bar 54 is moved by the latch-lug 16 on stop-disc 13, tang 77 on said fifth latch-bar engages tang 78 on the second latch-bar 51 so as to move said second latch-bar and back tang 82 on said fifth latch-bar engages the front tang 83 on the fourth latch-bar 53 so as to move said fourth latch-bar.

The movement of the various latch-bars 49, 51, 52, 53, and 54 either latches, releases, or prevents the latching of the various latch-springs 18' through 29' and the rocker-buttons 18 through 29 associated with said latch-springs. For instance, the movement of the first latch-bar 49 and consequently, the movement of the second latch-bar 51 and the fourth latch-bar 53, acts to release all of the latch-springs 18' through 29' except the latch-spring that was depressed to cause said movement of said first latch-bar. When the third latch-bar 52 is moved and held by latch-springs 21', 22', 25', 26', or 29', the second latch-bar 51 is moved and held by said third latch-bar so as to prevent the latching of latch-spring 18' until said third latch-bar is allowed to return to its original position. Latch-springs 18', 19', and 28' are released by the movement of the fifth latch-bar 54 which is moved at the end of the timer cycle by the latch-lug 16 on stop-disc 13, said movement of said fifth latch-bar causing movement of the second latch-bar 51 and the fourth latch-bar 53.

The rocker-button indexing mechanism of the present invention, as hereinbefore described in one of its embodiments, is merely illustrative and not exhaustive in scope. Since many widely different embodiments of the invention may be made without departing from the scope thereof, it is intended that all matter contained in the above description and shown in the accompanying drawing shall be interposed as illustrative and not in a limiting sense.

What is claimed is:

1. In combination, a timer and indexing device for determining a cycle starting point of said timer comprising, a base mounted on said timer, a plurality of latch-springs mounted to said base, a plurality of button means coupled to said latch-springs for depressing said latch-springs as said button means are displaced, a plurality of integrally formed metal strips, each of said strips having bent end portions and a main body portion, one of said end portions coupled to each of said latch-springs so as to rotate said main body when said buttons and latch-springs are depressed, said main body portions rotatably affixed to said base and extending therealong, said other end portions bent so as to have a tip protrude through an opening in said base when said main body is rotated, said tip functioning as a selective stop for an indexing member mounted on said timer, and a shaft for rotating said indexing member so as to engage said stop, thereby locating said cycle starting point.

2. In combination, a timer and indexing device for determining a cycle starting point of said timer comprising, a base mounted on said timer, a plurality of latch-springs mounted to said base, a plurality of button means coupled to said latch-springs for depressing said latch-springs as said button means are displaced, a plurality of integrally formed metal strips, each of said strips having bent end portions and a main body portion, one of said end portions coupled to each of said latch-springs so as to rotate said main body when said buttons and latch-springs are depressed, said main body portions rotatably affixed to said base and extending therealong, said other end portions bent so as to have a tip protrude through an opening in said base when said main body is rotated, said tip functioning as a selective stop for an indexing member mounted on said timer, a shaft for rotating said indexing member so as to engage said stop, thereby locating said cycle starting point, and said shaft being axially movable so as to disengage said indexing member from said stop.

3. In combination, a timer and indexing device for determining a cycle starting point of said timer comprising, a base mounted on said timer, a plurality of flat metallic latch-springs mounted to said base, a plurality of button means coupled to said latch-springs for depressing said latch-springs as said button means are displaced, a plurality of integrally formed metal levers, each of said levers having bent end portions and a main body portion, one of said end portions coupled to each of said latch-springs so as to rotate said main body when said buttons and latch-springs are depressed, said main body portions rotatably affixed to said base and extending therealong, said other end portions bent so as to have a tip protrude through an opening in said base when said main body is rotated, said tip functioning as a selective stop for an indexing member mounted on said timer, a shaft for rotating said indexing member so as to be restrained by said stop, thereby locating said cycle starting point, and said shaft being axially movable so as to disengage said indexing member from said stop.

4. In combination, a timer and indexing device for determining a cycle starting point of said timer comprising, a base mounted on said timer, a plurality of flat metallic latch-springs mounted to said base, a plurality of button means coupled to said latch-springs for depressing said latch-springs as said button means are displaced, a plurality of integrally formed metal levers, each of said levers having bent end portions and a main body portion, one of said end portions coupled to each of said latch-springs so as to rotate said main body when said buttons and latch-springs are depressed, a means for latching a predetermined combination of said latch-springs which are depressed, said main body portions rotatably affixed to said base and extending therealong, said other end portions bent so as to have a tip protrude through an opening in said base when said main body is rotated, said tip functioning as a selective stop for an indexing member mounted on said timer, a shaft for rotating said indexing member so as to be restrained by said stop, thereby locating said cycle starting point, and said shaft being axially movable so as to disengage said indexing member from said stop.

5. In combination, a timer and indexing device for determining a cycle starting point of said timer comprising, a base mounted on said timer, a plurality of latch-springs mounted to said base, a plurality of rocker-buttons pivotally mounted on said base and affixed to each of said latch-springs, a plurality of integrally formed metal levers, each of said levers having bent end portions and a main body portion, one of said end portions coupled to each of said latch-springs and said rocker-buttons so as to rotate said main body when said rocker-buttons are depressed, a means for latching said rocker-buttons in a depressed position, said other end portions bent so as to have a tip protrude through an opening in said base when said main body is rotated, said tip functioning as a selective stop for an indexing member mounted on said timer, a shaft for rotating said indexing member so as to be restrained by said stop, thereby locating said cycle starting point, and said shaft being axially movable so as to disengage said indexing member from said stop.

6. In combination, a timer and indexing device for determining a cycle starting point of said timer comprising, a base mounted on said timer, a plurality of latch-springs mounted to said base, a plurality of rocker-buttons pivotally mounted on said base and affixed to each of said latch-springs, a plurality of integrally formed metal levers, each of said levers having bent end portions and a main body portion, one of said end portions coupled to each of said latch-springs and rocker-buttons, a means for latching said rocker-buttons which are depressed and for releasing other of said rocker-buttons which are already depressed, said main body portion rotatably affixed to said base and extending therealong, said other end portions bent so as to have a tip protrude through an opening in said base when said main body is rotated, said tip functioning as a selective stop for an indexing member mounted on said timer, a shaft for rotating said indexing member so as to be restrained by said stop, thereby locating said cycle starting point, and said shaft being axially movable so as to disengage said indexing member from said stop.

7. In combination, a timer and means for locating a cycle starting point on said timer comprising, an indexing member mounted so as to be rotated by said timer, a plurality of levers having a first end and a second end integrally formed on a main body, a means for rotatably supporting said main body of each of said levers, each of said first ends being coupled to a means for rotating said main body, each of said second ends having a portion integrally formed thereon so as to restrain a preselected stop-lug on said indexing member when said main body is rotated, and a means for rotating said indexing member so as to be restrained by said portion formed on said second end of said levers, thereby locating said cycle starting point.

8. In combination, a timer and means for locating a cycle starting point on said timer comprising, an indexing member mounted so as to be rotated by said timer, a plurality of levers having a first end and a second end integrally formed on a main body, a means for rotatably supporting said main body of each of said levers, each of said first ends being coupled to a means for rotating said main body, each of said second ends having a portion integrally formed thereon so as to restrain a preselected stop-lug on said indexing member when said main body is rotated, a means for rotating said indexing member so as to be restrained by said portion formed on said second end of said levers, thereby locating said cycle starting point, and a means for disengaging said indexing member from said portion.

9. In combination, a timer and means for locating a cycle starting point on said timer comprising, an indexing member mounted so as to be rotated by said timer, a plurality of levers having a first end and a second end integrally formed on a main body, a means for rotatably supporting said main body of each of said levers, each of said first ends being coupled to a rocker-button so as to rotate said main body when said rocker-button is depressed, each of said second ends having a portion integrally formed thereon so as to restrain a preselected stop-lug on said indexing member when said main body is rotated, said preselected stop-lug being determined by depression of an associated rocker-button, a means for rotating said indexing member so as to be restrained by said portion formed on said second end of said levers, thereby locating said cycle starting point, and a means for disengaging said indexing member from said portion.

10. In combination, a timer and means for locating a cycle starting point on said timer comprising, a stop-disc mounted so as to be rotated by said timer, said stop-disc having a plurality of stop-lugs angularly spaced about said stop-disc, a plurality of levers having a first end and a second end integrally formed on a main body, a means for rotatably supporting said main body of each of said levers, each of said first ends being coupled to a means for rotating said main body, a means for holding said main body in a rotated position, each of said second ends having a portion integrally formed thereon so as to restrain a preselected stop-lug on said stop-disc when said main body is in said rotated position, a means for rotating said stop-disc so as to be restrained by said portion formed on said second end of said levers, thereby locating said cycle starting point, and a means for disengaging said stop-disc from said portion.

11. In combination, a timer and means for locating a cycle starting point on said timer comprising, an indexing member mounted so as to be rotated by said timer, a plurality of levers having a first end and a second end integrally formed on a main body, a means for rotatably supporting said main body of each of said levers, each of said first ends being coupled to a rocker-button so as to rotate said main-body when said rocker-button is depressed, a means for latching said rocker-buttons which are depressed and for releasing other of said rocker-buttons which are already depressed, each of said second ends having a portion integrally formed thereon so as to restrain a preselected stop-lug on said indexing member when said main body is rotated, said preselected stop-lug being determined by depression of an associated rocker-button, a means for rotating said indexing member so as to be restrained by said portion formed on said second end of said levers, thereby locating said cycle starting point, and a means for disengaging said indexing member from said portion.

12. In combination, a timer and means for locating a cycle starting point on said timer comprising, a stop-disc mounted so as to be rotated by said timer, said stop-disc having a plurality of stop-lugs angularly spaced about said stop-disc, a plurality of levers having a first end and a second end integrally formed on a main body, a means for rotatably supporting said main body of each of said levers, each of said first ends being coupled to a rocker-button so as to rotate said main body when said rocker-button is depressed, each of said second ends having a portion integrally formed thereon so as to restrain a preselected stop-lug on said indexing member when said main body is rotated, said preselected stop-lug being determined by depression of an associated rocker-button, a means for rotating said indexing member so as to be restrained by said portion formed on said second end of said levers, thereby locating said cycle starting point, a means for disengaging said indexing member from said portion, and a means for automatically releasing selected rocker-buttons when said timer completes a timing cycle.

13. In combination, a timer and means for locating a cycle starting point on said timer comprising, an indexing member mounted so as to be rotated by said timer, a plurality of levers having a first end and a second end integrally formed on a main body, a means for rotatably supporting said main body of each of said levers, each of said first ends being coupled to a rocker-button so as to rotate said main body when said rocker-button is depressed, a means for latching said rocker-button so as to hold said main body in a rotated position, each of said second ends having a portion integrally formed thereon so as to restrain a preselected stop-lug on said indexing member when said main body is in said rotated position, said preselected stop-lug being determined by depression of an associated rocker-button, a means for rotating said indexing member so as to be restrained by said portion formed on said second end of said levers, thereby locating said cycle starting point, a means for disengaging said indexing member from said portion, and a means for automatically releasing selected rocker-buttons when said timer completes a timing cycle.

14. In combination, a selective indexing mechanism and a timer having a rotating shaft upon which are mounted a plurality of switch activating members, said selective indexing mechanism for positioning said rotating shaft comprising an indexing member mounted on said rotating shaft so as to be rotated thereby, said indexing member having a plurality of stop-lugs projecting therefrom, a mounting plate affixed to said timer so as to be adjacent to said indexing member, a plurality of rocker-buttons pivotally mounted on said mounting plate, a latch-spring affixed to each of said rocker-buttons and to said mounting plate so as to hold said rocker-buttons in a de-activated position, a plurality of levers having a first end and a second end integrally formed on a main body, said main body of each of said levers being rotatably affixed to said mounting plate, each of said first ends being coupled to an associated latch-spring and rocker-button so as to rotate said main body when said rocker-button is depressed, each of said second ends having a tip integrally formed thereon so as to protrude through an opening in said mounting plate to restrain a preselected stop-lug on said indexing member when said main body is in a rotated position, said preselected stop-lug being determined by depression of an associated rocker-button, a means for latching said rocker-buttons that are depressed so as to hold said main body in said rotated position, a means for automatically releasing selected rocker-buttons when said timer completes a timing cycle, and a means for rotating said indexing member so as to cause said preselected stop-lug to be restrained by said tip, thereby positioning said rotating shaft.

15. In combination, a selective indexing mechanism and a timer having a rotating shaft upon which are mounted a plurality of switch activating members, said selective indexing mechanism for positioning said rotating shaft comprising, an indexing member coupled to said rotating shaft so as to be rotated thereby, said indexing member having a plurality of stop-lugs projecting therefrom, a mounting plate affixed to said timer so as to be adjacent to said indexing member, a plurality of rocker-buttons pivotally mounted on said mounting plate, a latch-spring affixed to each of said rocker-buttons and to said mounting plate so as to hold said rocker-buttons in a de-activated position, a plurality of levers having a first end and a second end integrally formed on a main body, said main body of each of said levers being rotatably affixed to said mounting plate, each of said first ends being coupled to an associated latch-spring and rocker-button so as to rotate said main body when said rocker-button is depressed, each of said second ends having a tip integrally formed thereon so as to protrude through an opening in said mounting plate to restrain a preselected stop-lug on said indexing member when said main body is in a rotated position, said preselected stop-lug being determined by depression of an associated rocker-button, a means for latching said rocker-buttons that are depressed so as to hold said main body in said rotated position, a means for automatically releasing selected rocker-buttons when said timer completes a timing cycle, a means for rotating said indexing member so as to cause said preselected stop-lug to engage and be restrained by said tip, thereby positioning said rotating shaft, and a means for disengaging said preselected stop-lug from said tip.

16. In combination, a selective indexing mechanism and a timer having a rotating shaft upon which are mounted a plurality of switch activating members, said selective indexing mechanism for positioning said rotating shaft comprising, an indexing member coupled to said rotating shaft so as to be rotated thereby, said indexing member having a plurality of stop-lugs projecting therefrom, a mounting plate affixed to said timer so as to be adjacent to said indexing member, a plurality of rocker-buttons pivotally mounted on said mounting plate, a plurality of levers having a first end and a second end integrally formed on a main body, said main body of each of said levers being rotatably affixed to said mounting plate, each of said first ends being coupled to a rocker-button so as to rotate said main body when said rocker-button is depressed, each of said second ends having a tip integrally formed thereon so as to protrude through a hole in said mounting plate to restrain a preselected stop-lug on said indexing member when said main body is in a rotated position, said preselected stop-lug being determined by depression of an associated rocker-button, a plurality of latch-bars coupled to said rocker-buttons so as to latch said rocker-buttons which are depressed, thereby holding said main body in said rotated position, said plurality of latch-bars functioning to release said rocker-buttons which are already depressed, a means for automatically releasing selected rocker-buttons when said timer completes a timing cycle, and a means for rotating said indexing member so as to cause said preselected stop-lug to engage and be restrained by said tip, thereby positioning said rotating shaft.

17. In combination, a selective indexing mechanism and a timer having a rotating shaft upon which are mounted a plurality of switch activating members, said selective indexing mechanism for positioning said rotating shaft comprising, an indexing member coupled to said rotating shaft so as to be rotated thereby, said indexing member having a plurality of stop-lugs projecting therefrom, a mounting plate affixed to said timer so as to be adjacent to said indexing member, a plurality of rocker-buttons pivotally mounted on said mounting plate, a latch-spring affixed to each of said rocker-buttons and to said mounting plate so as to hold said rocker-buttons in a de-activated position, a plurality of levers having a first end and a second end integrally formed on a main body, said main body of each of said levers being rotatably affixed to said mounting plate, each of said first ends being coupled to an associated latch-spring and rocker-button so as to rotate said main body when said rocker-button is depressed, each of said second ends having a tip integrally formed thereon so as to protrude through an opening in said mounting plate to restrain a preselected stop-lug on said indexing member when said main body is rotated, said preselected stop-lug being determined by depression of an associated rocker-button, a means for latching said rocker-buttons that are depressed, a means for releasing selected rocker-buttons when said timer completes a timing cycle, a means for turning said rotating shaft so as to cause said preselected stop-lug to be restrained by said tip, thereby positioning said rotating shaft, and said rotating shaft being axially movable so as to permit disengagement of said preselected stop-lug from said tip.

References Cited

UNITED STATES PATENTS 2,973,672   3/1961   Thornbery _____ 74—3.52
3,236,123   2/1966   Beck et al. _____ 74—813

MILTON KAUFMAN, *Primary Examiner.*